United States Patent [19]

Freeman

[11] Patent Number: 5,748,282
[45] Date of Patent: May 5, 1998

[54] MULTIFOCAL CONTACT LENS

[75] Inventor: Michael H. Freeman, Wales, United Kingdom

[73] Assignee: Pilkington Barnes Hind, Inc., Sunnyvale, Calif.

[21] Appl. No.: 495,463

[22] PCT Filed: Jan. 25, 1994

[86] PCT No.: PCT/US94/00918

§ 371 Date: Oct. 5, 1995

§ 102(e) Date: Oct. 5, 1995

[87] PCT Pub. No.: WO94/17435

PCT Pub. Date: Aug. 4, 1994

[30] Foreign Application Priority Data

Jan. 27, 1993 [GB] United Kingdom .................. 9301614

[51] Int. Cl.$^6$ ............................................. G02C 7/04
[52] U.S. Cl. ............................................. 351/161; 351/177
[58] Field of Search .................... 351/160 H, 160 R, 351/161, 162, 177

[56] References Cited

U.S. PATENT DOCUMENTS

| | | | |
|---|---|---|---|
| 4,407,766 | 10/1983 | Haardt et al. | 351/160 H |
| 4,637,697 | 1/1987 | Freeman | 351/161 |
| 4,642,112 | 2/1987 | Freeman | 351/161 |
| 4,881,805 | 11/1989 | Cohen | 351/161 |
| 4,909,818 | 3/1990 | Jones | 351/161 |
| 5,009,497 | 4/1991 | Cohen | 351/161 |
| 5,016,977 | 5/1991 | Bavde et al. | 351/160 R |
| 5,089,023 | 2/1992 | Swanson | 623/6 |
| 5,100,226 | 3/1992 | Freeman | 351/160 R |
| 5,114,220 | 5/1992 | Bavde et al. | 351/160 R |
| 5,198,844 | 3/1993 | Roffman et al. | 351/161 |

FOREIGN PATENT DOCUMENTS

| | | |
|---|---|---|
| 0 109 753 | 5/1984 | European Pat. Off. . |
| 0 343 067 | 11/1989 | European Pat. Off. . |
| 0 457 553 | 11/1991 | European Pat. Off. . |
| 2 243 100 | 8/1993 | United Kingdom . |

*Primary Examiner*—Scott J. Sugarman
*Attorney, Agent, or Firm*—Burns, Doane, Swecker & Mathis, LLP

[57] ABSTRACT

A multifocal contact lens has diffractive power arising from a series of concentric zones each providing an asymmetric retardation of light across the zone width to direct light predominantly into a required order and sign of diffraction. At least some of the concentric zones are shaped so that the step height varies so that it is different in one region (A) of the lens from that in another region (B), whereby the intensity of light associated with an image observed by diffraction at one order in that region (A) of the lens is greater than the light intensity associated with the same image when observed at the same order through another region (B) of the lens.

20 Claims, 5 Drawing Sheets

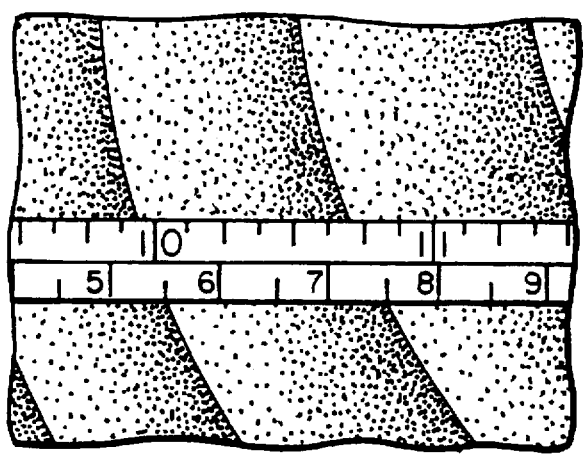
FIG_1
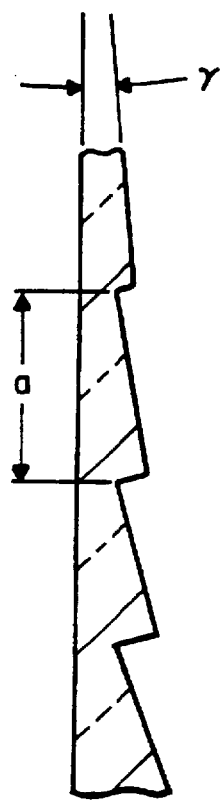
FIG_3A

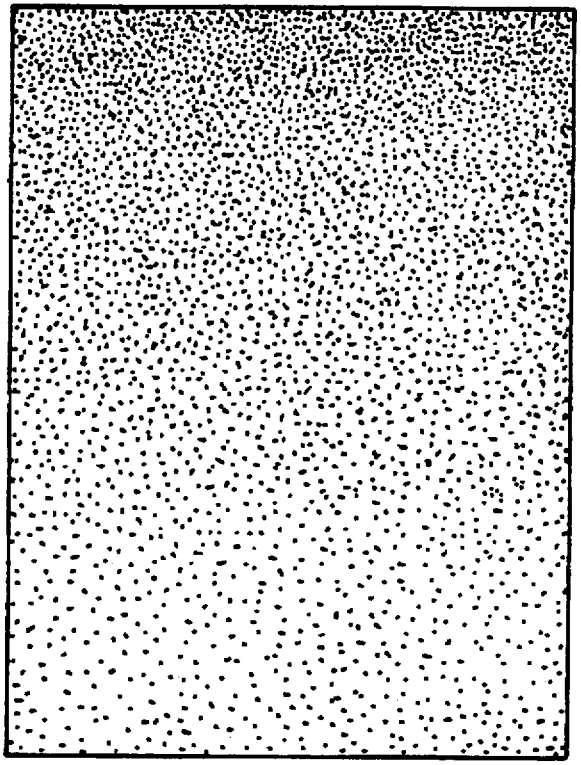
FIG_2
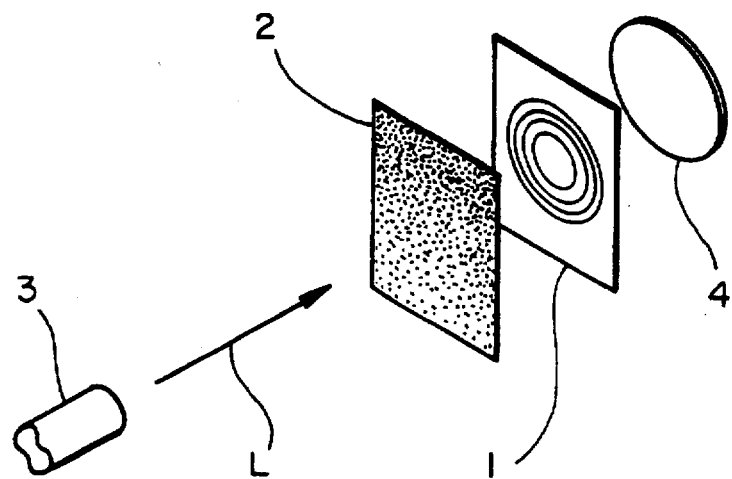
FIG_3

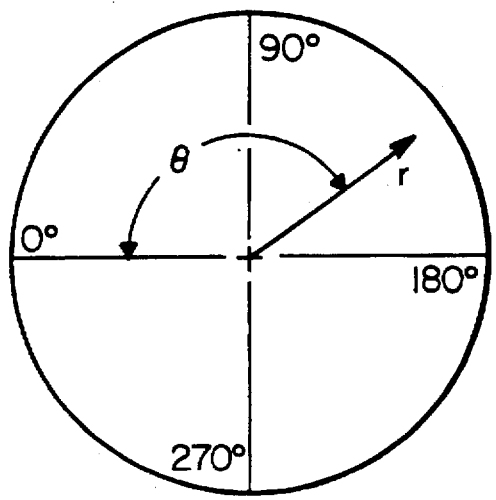
FIG_4
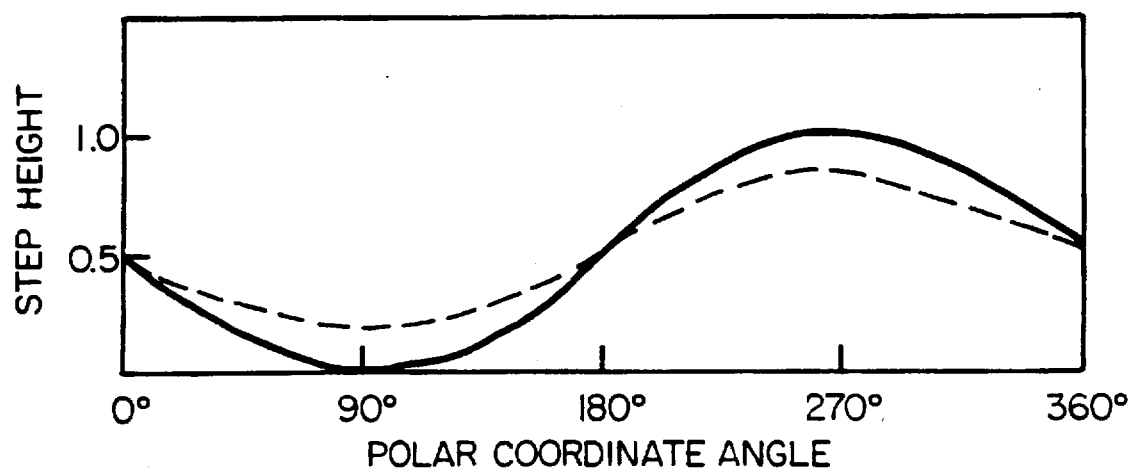
FIG_5

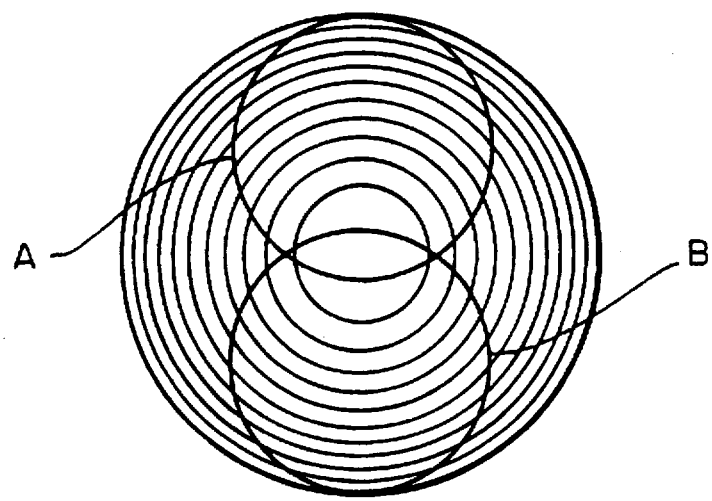
FIG_6
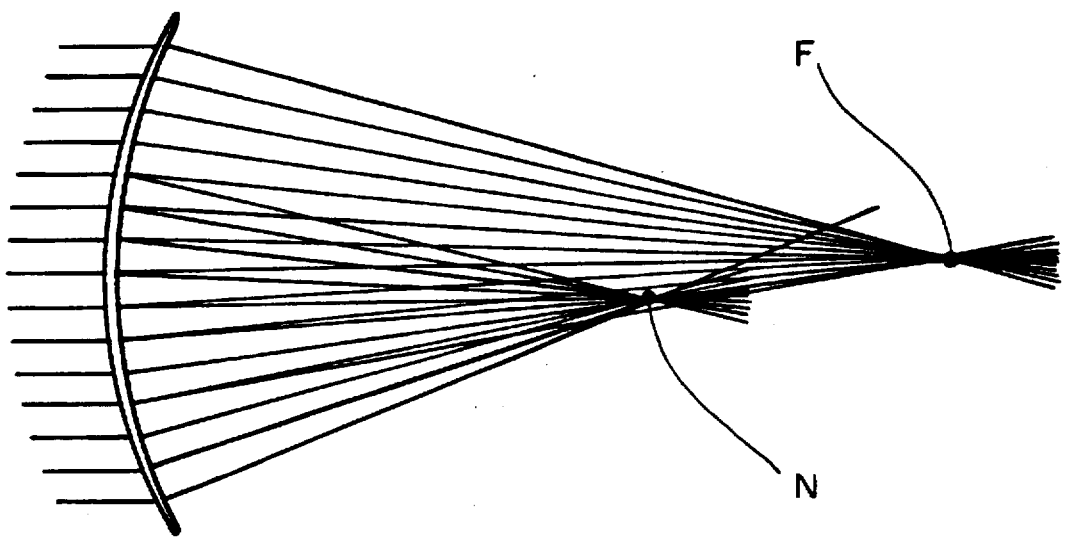
FIG_7

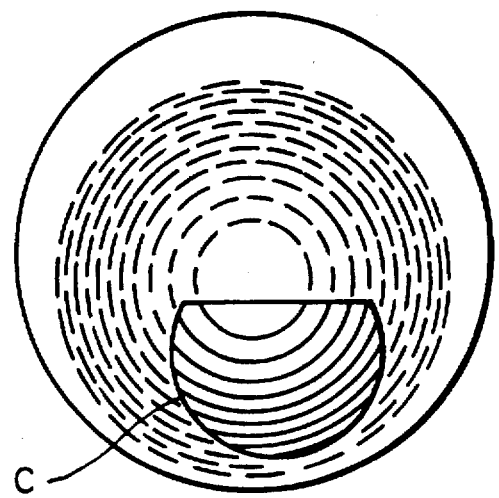
FIG_8
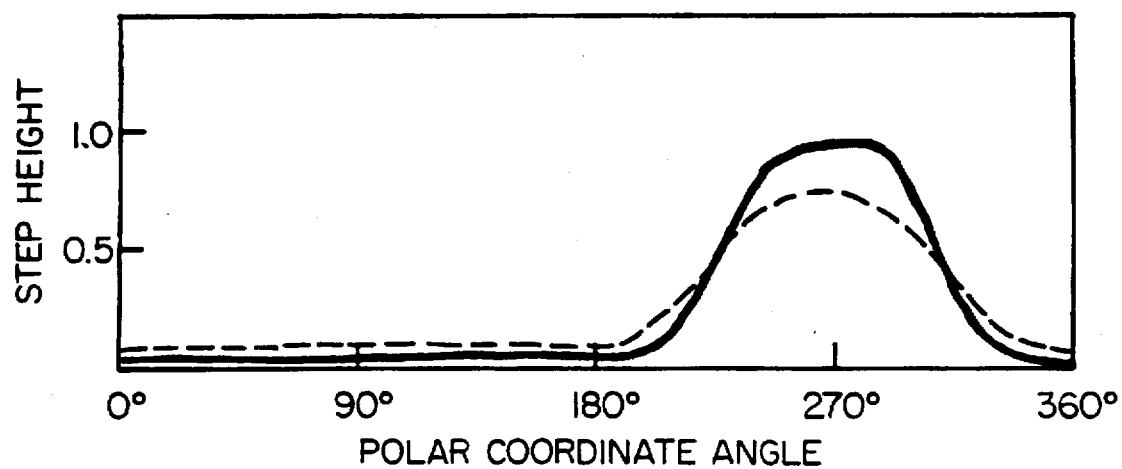
FIG_9

MULTIFOCAL CONTACT LENS

This invention relates to multifocal (including bifocal) contact lenses, and more particularly to such lenses having diffractive power.

U.S. Pat. No. 4,637,697 describes a bifocal contact lens in which at least a portion of the light passing through the lens is focussed by asymmetric zone plate surfaces. Such zone plate surfaces comprise a plurality of concentric zones arranged so as to cause diffraction of light transmitted through the lens, each zone providing an asymmetric retardation of light across the zone width. In one form of that invention, the zones are defined and the asymmetric retardation is provided by the surface contour of the lens.

In particular, the zones may be defined by steps in the lens surface. The lenses of U.S. Pat. No. 4,637,697 are designed to operate as bifocal lenses and in one form the concentric zones are arranged so that the lens surface forming the zone is in the form of a slope whose profile is uniform all round the concentric zone. Zones of this form may be shaped directly by means of laser machining using a suitably shaped mask, or by directly cutting with a diamond tool. This form of zone plate commonly results in most of the light in the visible spectrum being directed into a zero power and one positive power image. In the type of lens where there is a need for some refractive power to correct for distance vision, the refractive power will be undisturbed by the zero-order image of the diffractive power. The power for the near image is provided by the diffractive effect, and the added power, which is the difference between the overall power for distance viewing and the overall power for near viewing, is provided entirely by the diffractive effect. In this type of lens there is no need for orientation on the eye as the bifocal lens operates in the so-called simultaneous vision mode with both near and distance viewing being available to the eye at all points on the optical portion of the lens.

Multifocal contact lenses are also known which do not rotate on the cornea and may be stabilized in position by several methods. The most common method is one involving some form of ballasting i.e. shaping the lens so that it is thicker and thus heavier at one portion of the edge. Lenses can be produced with a wedge or prism shape with the thicker portion at the bottom. Lenses can also be truncated or cut off so that a lower portion is wider and heavier than the rest of the lens and thus able to maintain a particular orientation on the eye. These lenses contain separate areas on the lens for distance, near and where necessary intermediate vision. The ballasting causes the lens to return to a stable lower position on the eye after blinking when the wearer is looking straight ahead. In this position, the distance portion of the lens is located so that it is aligned in front of the pupil. Moving the eye down to read causes the lens to be pushed up as it is contacted by the lower lid so that the pupil becomes aligned with the portion of the lens that contains the near viewing portion. Such lenses can suffer from jump i.e. the problem of a displaced image that occurs as the eye shifts from distance to near and passes the boundary between the near and the distance portion. Such jump can be eliminated by using so-called mono-centric bifocals but many patients needing bifocals may find problems in being fitted with such lenses.

Contact lenses have been made available in the marketplace which utilize the diffractive effect for focussing the near image. Such lenses, unlike the ballasted multifocal lenses referred to above, do not need to be oriented on the eye but nevertheless are subject to some movement on the eye particularly when the eye moves down to read. The users of the multifocal lenses in general have reached an age where the amount of light needed for reading and close work is substantially greater than that needed by e.g. a twenty year old. The ability to read and do close work is therefore influenced by the light intensity of the image. In the case of a lens which uses asymmetric zone plate surfaces, as described in U.S. Pat. No. 4,637,697, when a zone plate is arranged with the step height of the individual concentric zones uniform, the light intensity of a near image is virtually the same whichever part of the lens is being used.

It has now been found that the performance of a multifocal contact lens which uses the diffractive effect for focussing at least one image can be improved by increasing the light intensity of an image at one order as seen in one part of the lens from the same image at the same order in another part of the lens. This invention is based on achieving this change in light intensity by selecting an area of the lens in which a change in light intensity is desired and within that area changing the diffractive effect, e.g. by changing step height of each individual zone when it becomes a part of that area.

It has been proposed to use bifocal lens designs having concentric zones which in the outer circumferential area of the lens differ in step height from zones in the inner portion of the lens see, e.g. U.S. Pat. No. 4,881,805 and EP-A-0343067. In so far as these specifications are understood, a lens according to these prior specifications is designed to direct light into a different diffractive order, in different concentric regions. These designs are in essence symmetrical in the sense that in any such region, all zones are at the same step height at all points on their circumference, and may be said to be circularly symmetrical.

According to one aspect of the present invention, there is provided a multifocal contact lens in which at least one image at one order (preferably selected from +1 and −1) is produced by diffraction and that image as seen by the eye through one part of the lens is differentiated from the same image at the same order as seen by the eye through another part of the lens by having a different intensity of light.

In order to achieve the change of light intensity associated with a focussed image at one order in one part of a lens from that in another part of the lens, which uses concentric asymmetric zone plate surfaces, it is necessary to change the step height of the zones in an oriented manner. Instead of any one zone having the same step height all round the concentric zone, the height is changed relative to another value as one moves into a predetermined region of the lens and back to the original height as the region is left. This may be done for all zones passing through the region so that the whole of the predetermined region is at the same step height which differs from the step height in the rest of the lens. This change in step height is not associated with any change in zone width. It is preferred that an abrupt change in step height be avoided and to move in a smooth manner from one step height to the other so as to blend the region of one step height into the region of the other step height.

The invention further provides a multifocal contact lens having diffractive power, comprising a plurality of concentric zones arranged so as to cause diffraction of light transmitted through the lens, each zone providing an asymmetric retardation of light across the zone width in a manner which directs light of a design wavelength predominantly into one required order and sign, (preferably chosen from +1 to −1), at least a number of the concentric zones being shaped so that the step height of each zone changes so that it is different in one region of the lens from that in another region of the lens, whereby the intensity of light associated with an image observed by diffraction at one order in that region of the lens is greater than the light intensity associated with that same image when observed at the same order through any other portion of that lens.

The manufacture of such a surface contour can be achieved by laser ablation or by cutting with a suitable tool, e.g. on a computer-controlled lathe. In the case of laser ablation, the laser beam is masked in such a way that the energy transmitted is varied by using a mask or combination of masks of varying transmission. The use of such a mask or masks permits transmission of an amount of energy corresponding to the amount of material it is necessary to remove to achieve a particular contour.

The use of laser ablation to form the surface contour is preferred and the present invention includes a method of manufacturing a multifocal contact lens having diffractive power which comprises interposing a mask shaped to provide a zone plate pattern on the finished lens between a laser source and the lens blank and in addition, providing means to vary the ablative effect of said laser over the area of the mask, whereby a zonal plate pattern is formed by ablation on the surface of the lens blank.

In general, the varying means is arranged to vary the diffractive power over the lens surface in such a way that the intensity of the image focussed by the diffractive power in one area of the lens at one order is different from the intensity of the image at the same order as seen through another area of the lens.

In one manufacturing scheme, the varying means comprises a second mask whose transparency towards the light emitted by the laser varies across its surface, thereby varying the ablative effect of the laser beam.

Thus, the invention further particularly provides a method of producing a contact lens with diffractive power comprising the step of ablating a lens surface with a laser beam which has passed through two masks, one of which has pattern defining zones with a density grading across each zone width effective to produce diffractive zones on the lens surface and the other of which has a density grading effective to modify the intensity of ablation across the visually used area of the lens surface so that different parts of the lens surface give different intensity diffractive effects. Preferably, said one mask is such that it would produce diffractive zones of a uniform step height and the other mask is effective to vary that step height across the lens or at least part of the lens.

It will be appreciated that the two masks can be combined to form a single mask performing the two functions described above.

The ability to manufacture a lens according to the invention by laser ablation means that the lens can be fitted on an individual basis tailored to the particular needs of a patient. A ballasted blank lens (or other blank lens having means to maintain a particular orientation on the eye) with no means to focus an image by diffraction can be oriented on the eye, and then removed and ablated to provide diffractive power on all or a part of the lens, the ablation also being controlled so that the step height of each zone is varied in a manner which results in separate regions being formed whereby the ratio of the light intensity associated with an image at one first order in one part of the lens to the light intensity associated with the same image at the same order in another part of the lens is chosen to meet the particular needs of the wearer.

Although, in preferred embodiments the zones have been described as concentric zones, the lens as formed can be made such that it encompasses only a portion of the concentric zone system, and that portion can be further subdivided by varying the step height of each zone so as to provide regions where the light intensity associated with an image in one region of the lens varies from the light intensity associated with the same image in another region of the lens.

A lens dispenser (ophthalmic optician) can, by virtue of the present invention, then be provided with a means of adding a further variable to what can be achieved with lens fitting thus increasing the ability to satisfy a patient's needs. The actual lens to be ablated does not necessarily need to be used in determining fit, as the dispenser can have a fitting set and order a lens from a central source based on the use of the fitting set.

The production of lenses in accordance with the invention is described below with reference to the accompanying drawings, in which:

FIG. 1 is a magnified section of the graded pattern suitable for a mask produced by a photo-typesetter.

FIG. 2 is a magnified reproduction of another graded pattern of spots which changes in density in a uniform manner.

FIG. 3 is a diagrammatic view of how a pair of masks, one based on the graded pattern of FIG. 1, and the other on the pattern of FIG. 2 can be placed between the lens to be ablated and a laser beam.

FIG. 3A graphically depicts in cross-section the change in step height for an upper portion of one of the concentric zones of the ablated lens.

FIG. 4 is a diagrammatic representation of polar coordinates used to define position on the lens surface.

FIG. 5 is a diagram showing step height against polar coordinate angle for one embodiment of the lens.

FIG. 6 illustrates diagrammatically a lens, with two pupil positions for the eye identified by circles A and B.

FIG. 7 is a schematic representation of a series of "image rays" passing through a lens.

FIG. 8 is a diagram of a lens with a zone plate pattern applied thereto, and a change in step height having an effect within a "D" shaped segment on the lens surface.

FIG. 9 is a diagram showing step height against polar coordinate angle with a smooth change to and from a maximum step height in a preferred area in another embodiment of the lens.

Lenses may be ablated in the case of soft lenses in both the hydrated and xerogel state. Co-pending British application 9008580.4 (GB-A-2243100) describes a convenient system for the ablation of contact lenses to provide diffractive power.

Lenses may also be ablated using an excimer laser where the beam profile is modified in the first instance so as to create a series of diffracting zones of uniform step height and in the second instance to create a smoothly varying intensity over the optical area of the lens, both these modifications being imposed on the same beam profile before it is incident on the surface to be ablated.

FIG. 1 shows a pattern of spots of varying density produced by a computer-controlled photo-typesetter output which may be reproduced on a light transmitting substrate in the form of a coating of metal reflecting spots. The pattern defines a series of concentric zones, only part of which is shown in FIG. 1, with a graded density across each zone width. The superimposed rulers simply indicate scale with the upper number representing inches the lower numbers representing centimeters. This pattern may then be imaged with reduction onto the surface to be ablated using an optical system which does not resolve (reproduce) the individual spots and so creates a smoothly varying effect within each zone. At the same time, another transparent substrate is introduced into the beam which has, for example, a slowly varying density of spots from, say top to bottom, as shown in FIG. 2. FIG. 3 shows a first mask 1 having a series of concentric zones as partly shown in FIG. 1 and a second mask 2 having a general even gradation as shown in FIG. 2 mounted in the light path of an ablating laser beam L from a laser source 3 to a surface to be ablated of a lens 4. With both masks 1 and 2 simultaneously in the beam path, the ablated surface is influenced by both mask profiles, the grading influence being within the zones by mask 1 and overall by mask 2.

The pattern of concentric zones on mask 1 is designed in the manner described in GB-A-2243100 in order to produce a lens having a lenticular surface formed with a series of concentric zones as described in U.S. Pat. No. 4,637,697. Preferably, the concentric zones are formed on the concave back surface of the lens, although it is possible to provide some or all of the diffractive power on the concave front surface. The effect of the second mask 2 is to modify the step height of the zones in the manner indicated below.

FIG. 3A shows a cross-sectional view of an upper portion of one of the series of concentric zones of the ablated lens 4 shown in FIG. 3. The step sizes of the diffraction grating progressively increase from the top of the lens to the bottom, thereby changing the blaze angle $\gamma$, and therefore, the focal point of an order of a principle diffraction maxima m, in accordance with the general equation $$a\sin(-2\gamma) = m\lambda_o$$

wherein $\lambda_o$ is the chosen wavelength and a is the length of the step.

The optical action of a profile step is normally expressed in terms of the wavelength ($\lambda_o$) of some chosen color of light; for vision purposes this could be green. The action required for a bifocal effect would be in the region of 0.5 $\lambda_o$ although this can also be expressed as 1.0 $\lambda_d$ where $\lambda_d$ is a 'design' wavelength rather than the utilized wavelength.

Using $\lambda_o$ in this instance it can be seen that if the uniform step height ablated if the mask of FIG. 1 were used on its own was 1.0 $\lambda_o$, then the influence of FIG. 2 is to reduce this step height to a fractional value which changes for different regions of the optical area.

This action is also dependant on the refractive indices of the adjacent materials but for simplicity, 'step height' is here taken to mean the optical action of the step so that a 'step height' of $\lambda_o$ has a nominal full diffraction efficiency.

For example, the uniform change of FIG. 2 could give a zero step height at the top and 1.0 $\lambda_o$ step height at the bottom. Around each zone the step height would change in a cyclic fashion. Taking FIG. 4 as defining the region of the lens in terms of polar coordinates, i.e. indicating a particular point by radius 'r' and angle '$\theta$' between 0 degrees and 360 degrees, the effect of the wedge filter described in FIG. 2 would be a step height for the outer zones (r large) which varies from 0 to 1 $\lambda_o$ while the step height for the inner zones (r small) would vary about the same mean value but by a smaller amount. FIG. 5 shows the general effect with the full line representing the outer zones and the broken line the inner zones, the maximum step height being at 270 degrees, i.e. towards the bottom of the lens, and the minimum step height being at 90 degrees, i.e. towards the top of the lens. The mathematical description could be:

$$h = \frac{r(1 + \sin\theta)\lambda_o}{2R}$$

where h is the height of the step, r is the zone radius, R is the maximum zone radius and $\theta$ the orientation angle as defined in FIG. 4.

Such a smoothly generated wedge effect is shown diagrammatically in FIG. 6 where the circles indicating the zone edges have been thickened in the region where the step height is greater. FIG. 6 shows that a lens placed on the eye so that the pupil is in position A will view the outside world via mainly low step height zones and will see a strong in-focus image for distant objects. If the lens is repositioned on the eye (by the eye looking downwards, for instance), the pupil has an effective position given by B in FIG. 6. It is now viewing via a region of the lens where the step height is large and will see a strong in-focus image for nearer objects.

FIG. 7 gives an indication of the strength of the image light in terms of rays but this is a purely schematic diagram as the diffractive effects, particularly in the central region with a more even division of the images, cannot be expressed in terms of rays. However, for appreciable pupil sizes covering 3 to 4 zones of the diffractive pattern, these rays give a representative interpretation. FIG. 7 is an effective vertical section through a lens as illustrated in FIG. 6, i.e. having greater step heights towards the bottom of the lens and smaller step heights towards the top. The diffracted 'rays' passing through the bottom part of the lens are therefore of greater intensity than the non-diffracted (or zero order) rays passing through that part. Looking through the bottom part of the lens therefore gives a near image N (produced by diffraction) of greater intensity than the zero order image F. Conversely, the non-diffracted (or zero order) rays passing through the upper part of the lens are of greater intensity than the diffracted 'rays' passing through the upper part and therefore looking through the upper part of the lens gives a far image F (to which the non-diffracted rays are refracted) of greater intensity than the near image N.

FIG. 8 schematically shows a lens having concentric zones providing a diffractive effect additional to any refractive effect of the lens. The step height of the zones is uniform (but relatively low) where the zones are indicated by broken line but in a 'D' shaped segment C the step height is graded as previously discussed so that it increases gradually from the top of the segment (which is substantially horizontal) to the bottom. Hence, as previously explained, a greater intensity near image is seen by looking through the lower part of the segment C than through its upper part of looking through other regions of the lens where the far image has greater intensity.

Usually, the multifocal lenses produced in accordance with the invention will have a refractive power attributable to the general curvature of the front and back surfaces and the refractive index of the lens material. The concentric zones provide 'add-on' or 'subtractive' power compared with the refractive power of the lens. In order to operate satisfactorily, a lens such as shown in FIGS. 6 or 8 will need to be orientated in the appropriate way on the cornea. This can be achieved, e.g. by providing a ballast on one side of the lens, to ensure that the desired area for near vision comes to rest preferentially on the lower part of the cornea. A ballasted lens blank (or a lens blank having other orientation means) and having the desired refractive power for distant vision for a particular patient is conveniently used as the lens 4 (see FIG. 3) in a laser ablative method of forming a lens with non-uniform diffractive power in accordance with this invention.

Methods of preparing ballasted lenses are well known in the art. For example, they are described in the book by Stein et al entitled "Fitting Guide for Rigid and Soft Contact Lenses, published by The C.V. Mosby Company, St. Louis, Mo. (1990), pages 319 et seq. In addition, reference may be made to the following U.S. patents for details of manufacture of such lenses, viz: U.S. Pat. No. 4,407,766; U.S. Pat. No. 4,642,112; U.S. Pat. No. 5,009,497; U.S. Pat. No. 5,009,497; U.S. Pat. No. 5,100,226 and U.S. Pat. No. 5,198,844.

In an alternative version of a lens of the type shown in FIG. 8, the step height may be uniform throughout the segment C but higher than the uniform step height over the remainder of the lens. With this arrangement looking anywhere through the segment C would give a near image of greater intensity than looking anywhere else through the lens to give a far image of greater intensity.

However, sudden changes in step height may be undesirable and it may be preferable to give a progressive change. FIG. 9 shows a localized step height variation depicted on the polar coordinate basis previously mentioned. For the outer zones (indicated by full line) of the lens the step height is very low over the 0 degrees and 180 degrees region but gradually increases after 180 degrees to a maximum flattened peak spanning the 270 degrees area (i.e. the bottom part of the lens) and then gradually decreases back to the very low value at 360 degrees/0 degrees. The inner zones (indicated by broken line) of the lens have a step height which follows a similar, but less pronounced, progressive gradation so that their maximum step height at 270 degrees (i.e. towards the bottom of the lens) is less than that of the outer zones and their minimum step height from about 0 degrees to 180 degrees (i.e. in the upper part of the lens is greater than that of the outer zones).

It will be appreciated that in FIG. 9, and also in FIG. 5, for ease of illustration the outer zones' step height is represented by a single full line and the inner zones' step height is represented by a single broken line. In practice, of course, there may be a progressive change in step height from the innermost zone to the outermost zone so that FIGS. 9 and 5 would, if properly representing the full situation, have a number of step height lines corresponding to the number of zones. For convenience, however, the full line and broken line shown can be considered as representing the outermost and innermost zone step height respectively.

In the particular embodiments and examples specifically described above it is generally envisaged that the used order of diffraction is first order and the diffractive power is positive, i.e. the +1 order. It will be understood however, that the diffractive power could be negative, e.g. the −1 order could be used, or other orders, whether positive or negative could be used. Negative diffractive power could effectively subtract from positive refractive power of the basic lens so that the refractive power gives a near image and diffraction provides a far image. Usually, the described wedge effect would then be reversed so that the more intense diffraction occurs towards the top of the lens to give a strong image of near objects being given through the lower part of the lens by more intense refraction.

It will further be understood that while the diffractive action is preferably achieved by the use of concentric zones having appropriate surface relief step heights giving the required different intensities or efficiencies of diffraction, it could alternatively be achieved by the use of refractive index variations in the material of the lens which give the required image differentiation when viewed through different parts of the lens. This can be achieved by conventional means such as varying the monomer composition through a layer and polymerizing before diffusion effects offset the variable composition. As is also conventionally known, a more viscous composition may be helpful in reducing diffusion. Furthermore, reference can be made to Summerville, Plastic Contact Lens, Noyes Data Corporation, Park Ridge, N.J. (1972), which discloses at pages 69–71 the fusion of materials of different refractive index.

Although lenses in accordance with the invention are conveniently prepared by the laser ablative method described above, an alternative method of production involves the use of a computer-controlled lathe. Such a lathe may operate to position a cutter in accordance with signals derived in the manner that FIGS. 5 and 9 have been derived from a computer stored analogue of the masks 1 and 2, shown in FIGS. 1, 2 and 3.

The lenses of the present invention may be hard (e.g. gas permeable lenses) or soft, e.g. hydrogel lenses, the chemical constitution of which is well known in the art.

I claim:

1. A multifocal contact lens having diffractive power in which at least one image at one order is produced by diffraction and that image as seen by the eye through one part of the lens is differentiated from the same image at the same order as seen by the lens through another part of the lens by having a different intensity of light.

2. A multifocal contact lens as claimed in claim 1 in which the diffractive power is provided by variation in the refractive index of the lens material.

3. A multifocal contact lens having both refractive and diffractive power, the diffractive power being provided by asymmetric zone plate surfaces and being distributed over a viewing area of the lens in such a way that the intensity of the image focussed by the diffractive power in one part of said area is greater than that in another part.

4. A multifocal contact lens as claimed in claim 3 in which the diffractive power is provided by variation in the refractive index of the lens material.

5. A multifocal contact lens having diffractive power which comprises a plurality of concentric zones arranged so as to cause diffraction of light transmitted through the lens, each zone providing an asymmetric retardation of light across the zone width in a manner which directs light of a design wavelength predominantly into one required order and sign, at least some of the concentric zones being shaped so that the step height of each zone changes so that it is different in one region of the lens from that in another region of the lens, whereby the intensity of light associated with an image observed by diffraction at one order in that region of the lens is greater than the light intensity associated with the same image when observed at the same order through any other portion of that lens.

6. A multifocal contact lens as claimed in claim 5, wherein each zone directs light predominantly into the +1 or −1 order.

7. A multifocal contact lens as claimed in claim 5 wherein the diffractive power is additional to the refractive power provided by the material of the lens and the basic curvature of its lenticular surfaces.

8. A multifocal contact lens as claimed in claim 5 wherein some of said concentric zones have a step height which is non-uniform across the zone width circumferentially of said zone.

9. A multifocal contact lens as claimed in claim 7 which is ballasted so that the region of the lens which provides the higher intensity of light associated with add-on diffractive power is oriented to rest downwardly on the cornea.

10. A multifocal contact lens as claimed in claim 5 in which the concentric zones are formed by shaping the surface contour of lens surfaces.

11. A multifocal contact lens as claimed in claim 10 in which said shaping is effected by cutting with a computer-controlled lathe.

12. A multifocal contact lens as claimed in claim 10 in which said shaping is effected by ablation with a laser.

13. A multifocal contact lens as claimed in claim 6 wherein the diffractive power is additional to the refractive power provided by the material of the lens and the basic curvature of its lenticular surfaces.

14. A multifocal contact lens as claimed in claim 5 in which the diffractive power is provided by variation in the refractive index of the lens material.

15. A method of manufacturing a multifocal contact lens having diffractive power which comprises interposing a mask shaped to provide a zone plate pattern on the finished lens between a laser source and the lens blank and in addition, providing means to modulate the ablative effect of said laser over the area of the mask, whereby a zonal plate pattern is formed by ablation on the surface of the lens blank.

16. A method as claimed in claim 15 wherein the effect of said modulating means is to produce a varying diffractive power over the lens surface.

17. A method as claimed in claim 15 wherein the modulating means comprises a second mask whose transparency towards the light emitted by the laser varies across its surface thereby modulating the ablative effect of said laser.

18. A method as claimed in claim 17 wherein said modulating means comprises a pattern of microscopic spots, the density of which varies across the surface of the mask.

19. A method as claimed in claim 17 in which the modulating means is combined with said first mask.

20. A method as claimed in claim 16 wherein the modulating means comprises a second mask whose transparency towards the light emitted by the laser varies across its surface thereby modulating the ablative effect of said laser.

* * * * *